United States Patent
Bolster et al.

[11] 3,708,860
[45] Jan. 9, 1973

[54] METHOD AND APPARATUS FOR CHOPPING A PLURALITY OF ARTICLES AND DEPOSITING THE ARTICLES IN COMPLEMENTARY ARTICLE RECEPTORS

[75] Inventors: Gene A. Bolster, Rush; Alva F. Mathes, Rochester, both of N.Y.

[73] Assignee: Eastman Kodak Company, Rochester, N.Y.

[22] Filed: March 4, 1971

[21] Appl. No.: 120,950

[52] U.S. Cl. ............... 29/430, 29/33 K, 29/33 P, 29/200 A, 29/211 D, 29/DIG. 44
[51] Int. Cl. ....... B23p 19/00, B23p 23/00, B23q 7/10
[58] Field of Search .29/430, 200 A, 211 D, DIG. 44, 29/33 K, 33 P

[56] References Cited

UNITED STATES PATENTS

| | | | |
|---|---|---|---|
| 2,627,212 | 3/1952 | Connor et al. | 93/1 R |
| 3,163,569 | 12/1964 | Brundage | 83/621 X |
| 3,379,466 | 4/1968 | Hughes | 29/DIG. 44 |

*Primary Examiner*—Thomas H. Eager
*Attorney*—William T. French, Robert F. Crocker and Steve W. Gremban

[57] ABSTRACT

A method and apparatus for simultaneously chopping a plurality of articles such as film chips from a web in which the film chips are contiguous or spaced a predetermined distance apart, transporting the film chips under the influence of gravity to a loading station and spreading the articles apart during such transport and precisely orienting and depositing the film chips in complementary film chip receptors which are positioned at the loading station in side-by-side relation. A plurality of guide tracks with the assistance of air jets transport the film chips from the chopping mechanism to the film chip receptors. Each of the guide tracks cooperates with mechanism at the loading station for precisely orienting and depositing each film chip in its complementary receptor.

15 Claims, 10 Drawing Figures

PATENTED JAN 9 1973

GENE A. BOLSTER
ALVA F. MATHES
INVENTORS

BY Steve W. Grenban

ATTORNEY

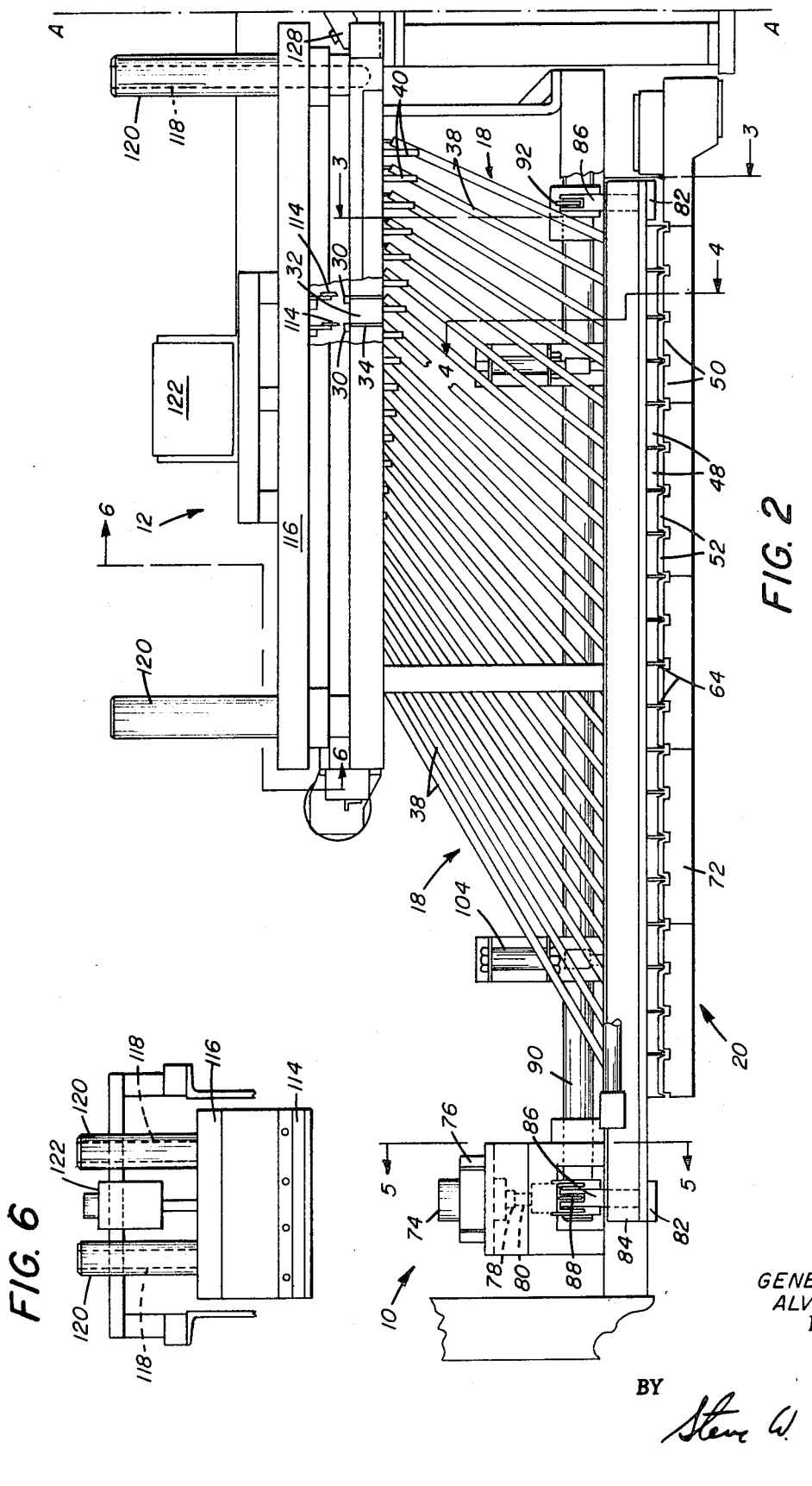

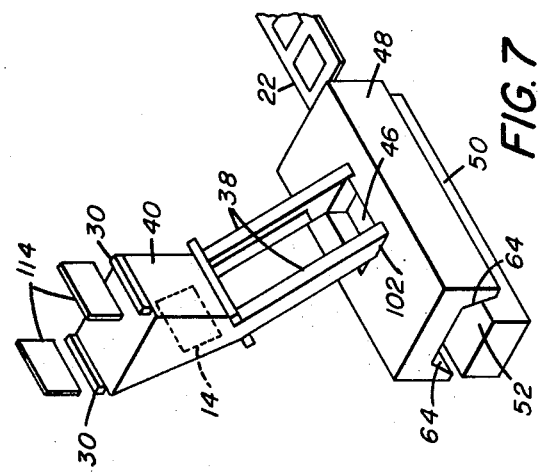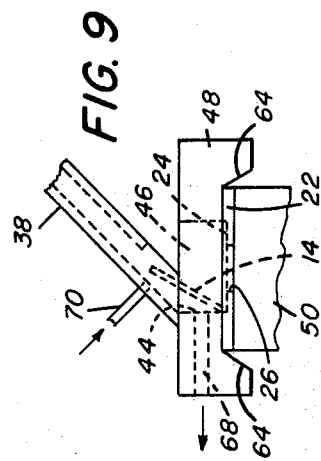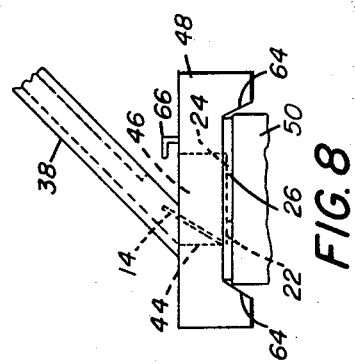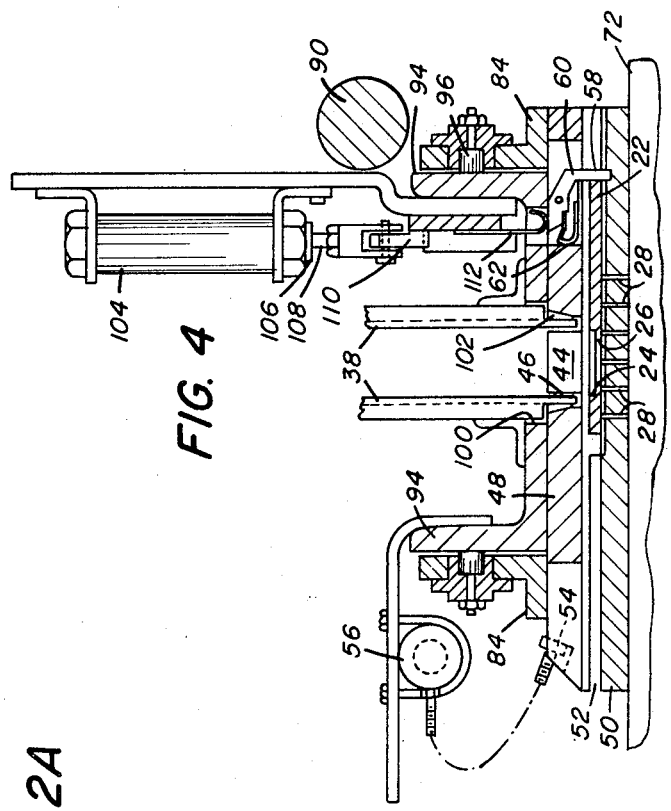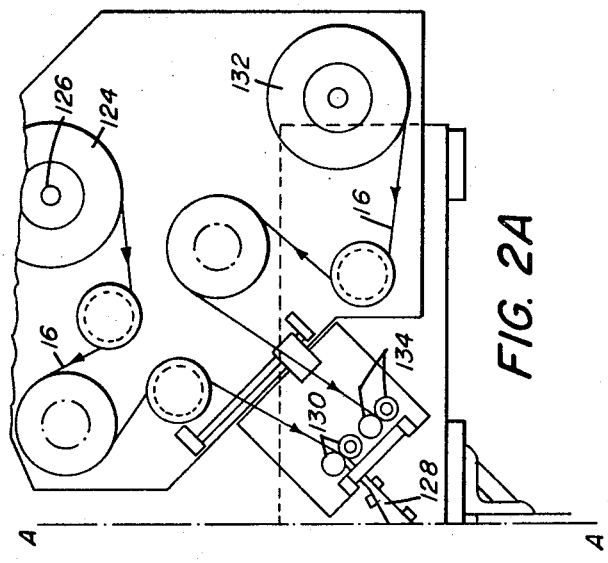
GENE A. BOLSTER
ALVA F. MATHES
INVENTORS
BY Steve W. Grembow
ATTORNEY

METHOD AND APPARATUS FOR CHOPPING A PLURALITY OF ARTICLES AND DEPOSITING THE ARTICLES IN COMPLEMENTARY ARTICLE RECEPTORS

BACKGROUND OF THE INVENTION

1. Field of the Invention

This invention relates generally to article mounting devices and more specifically to a method and apparatus for simultaneously chopping a plurality of contiguous articles from a web containing the articles and precisely orienting and depositing each of the articles in a complementary article receptor.

2. Description of the Prior Art

It is known in the prior art to convey flat articles such as sheets by guide chutes and fluid streams. Also, the use of an air assist in the form of air jets for transporting and guiding flat articles is generally well-known, as is the use of vacuum or suction feed to assist in handling the conveyance of an article. Apparatus is also known comprising a combined punching fixture and die for punching a film chip from a strip and precisely aligning the film chip on a frame. Although such apparatus is satisfactory for a single film chip, it is not adaptable to handling a plurality of film chips in contiguous relation since the frames for receiving the chips are of greater width and length than the chips, and hence the chips would have to be spaced apart in order to be properly seated in the frames. The prior art apparatus that applicants are aware of does not contain any disclosure or teaching of mechanism for accomplishing such a function.

SUMMARY OF THE INVENTION

This invention includes within its scope a method and apparatus for simultaneously chopping a plurality of articles such as film chips from a web such as a film strip in which the articles are either contiguous or spaced apart a predetermined distance, transporting the chopped articles from the chopping station to a loading station, spreading the articles apart a distance greater than the predetermined distance during such transport and precisely orienting and depositing each of the chopped articles in a complementary article receptor such as a film mount at the loading station. The articles chopped are preferably contiguous, and the article receptors have recessed portions for receiving the articles in which the recessed portions are spaced apart a distance greater than the distance between the articles at the chopping station. The transporting, orienting and depositing of the articles is assisted by gravity and air jets.

An object of the present invention is to provide an improved process and apparatus for chopping an article and precisely orienting and depositing the article in a complementary article receptor.

Another object of the invention is to provide an improved process and apparatus for simultaneously chopping a plurality of articles from a web containing contiguous or spaced articles, transporting the articles under the influence of gravity to complementary article receptors at a loading station, spreading the articles apart during such transport and orienting and depositing each of the chopped articles in its complementary article receptor.

The invention and its objects and advantages will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 2 is an enlarged side elevational view of the mounting machine of FIG. 1 with one end portion omitted;

FIG. 2A is a side elevational view showing the end portion omitted from FIG. 2;

FIG. 4 is an enlarged view in section taken along line 4—4 of FIG. 2;

FIG. 6 is an enlarged segmental view in section taken from line 6—6 of FIG. 2;

FIG. 7 is a schematic view in perspective showing the guiding and positioning mechanism for a single film chip;

FIG. 8 is an enlarged segmental view of a portion of the apparatus of FIG. 7 showing how the film chip is precisely oriented relative to a film mount; and FIG. 9 is an enlarged segmental view similar to FIG. 8 of another arrangement for orienting and depositing the film chip in a film mount.

DESCRIPTION OF THE PREFERRED EMBODIMENT

Figure 1:
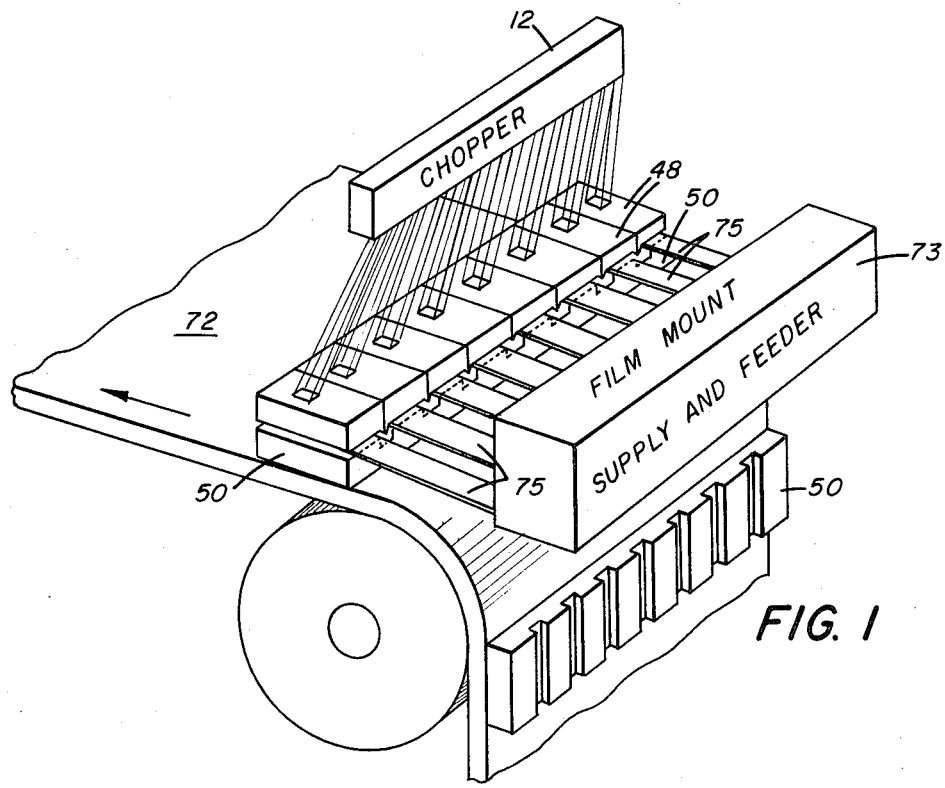
FIG. 1 is a segmental schematic view in perspective of the mounting machine of this invention in relation to a conveyor.

Because mounting apparatus for mounting articles such as film chips in film mounts are well-known, the present description will be directed in particular to elements forming part of, or cooperating more directly with, the present invention, mounting apparatus elements not specifically shown or described herein being understood to be selectable from those known in the art.

The invention is shown embodied in an automatic film-mounting machine 10 (see FIGS. 2, 2A and 7) having a chopping mechanism 12 of known type for simultaneously chopping a plurality of contiguous film chips 14 from a film strip 16 at a chopping station, transporting means 18 for guiding and transporting the chopped film chips 14 under the influence of gravity to a loading station in spread-apart relation, receiving and positioning means 20 at the loading station for receiving and precisely positioning film chip receptors such as film mounts 22, and orienting means comprising a part of the receiving and positioning means 20 for precisely orienting and depositing each of the film chips in a recessed area 24 surrounding an aperture 26 of a complementary film mount 22 as best seen in FIGS. 4, 8 and 9. After each of the chopped film chips 14 has been properly deposited within the recessed area 24 of its complementary film mount 22, vacuum means comprising openings 28 connected to any suitable vacuum source, not shown, are provided for holding the film chips 14 in position on the film mounts 22.

The loaded film mounts are removed from the loading station and forwarded to subsequent stations, not shown, where the film chip is tacked in position, the film mount folded along a central perforated line and the mount halves secured together to form a finished film mount containing a slide.

Figure 3:
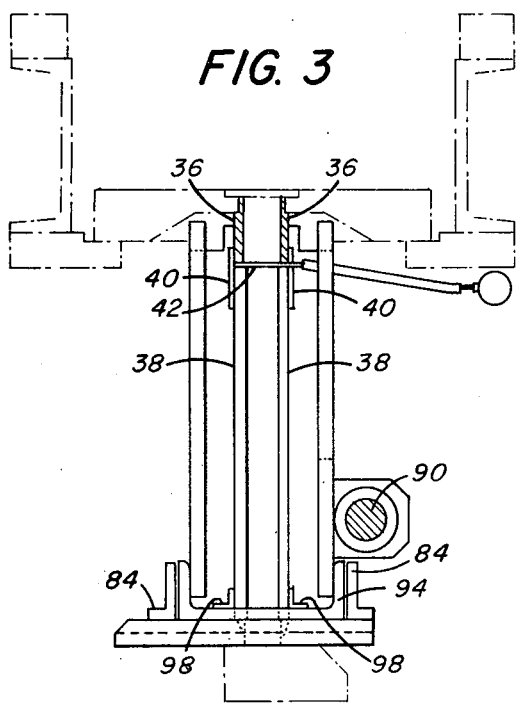
FIG. 3 is an enlarged segmental elevational view in section taken along line 3—3 of FIG. 2.

After a plurality of film chips 14 are simultaneously chopped from the film strip 16 as best seen in FIGS. 2 and 7, the unsupported edge of each of the film chips drops downwardly due to gravitational force and/or the assistance of air jets, not shown, as the opposite edge of the chip 14 is momentarily held by one of the fixed knife blades 30 upon which the edge of the chip rests. The inclined free film chip 14 drops into a guiding mechanism of the transporting means 18 comprising a vertical chute 32 formed by baffles 34, the edges of which are inserted in grooves in a pair of rigid, spaced apart plates 36 as best seen in FIG. 3. Due to the inclination imparted to film chip 14, the leading edge of the film chip is the first to exit from chute 32 and enters the upper end of a pair of spaced apart, inclined, U-shaped guide tracks 38 secured to plates 36 by brackets 40. The film chip 14 is transported downwardly within the guide tracks 38 by gravitational force and/or the assistance of oppositely positioned, downwardly directed air jets 42 near the top of the guide tracks to the orienting means comprising an opening 46 in a positioning platen 48 (see FIGS. 4 and 8) at the loading station. The leading end of each of the film chips 14 exiting from its guide track 38 strikes one wall 44 of opening 46. The positioning platen 48 is reciprocally movable relative to a complementary film mount supporting platen 50 between a retracted position, in which the platens 48, 50 are spaced apart to provide a passageway 52 (see FIG. 7) for receiving a film mount 22 therebetween, and a loading position in which the positioning platen 48 is moved into engagement with the film mount 22. Each of the film mounts 22 (see FIG. 4) is moved by any suitable means, such as air jets 54 connected to a pressurized air source 56, into engagement with an arm 58 of a pivotally mounted stop member 60, preferably on each of the positioning platens 48, although such stop members 60 may be mounted on the supporting platens 50. Each stop member 60 is biased by a spring 62 into a precise stop position for stopping the leading end of film mount 22 with the recessed area 24 of the film mount in register with the opening 46 in the positioning platen 48. Each positioning platen 48 is provided with tapered sides 64 (FIGS. 2 and 7-9) spaced apart a distance only slightly greater than the width of a film mount 22, which sides 64 engage the edges of the film mount 22 and laterally locate the film mount on the supporting platen 50 upon movement of the positioning platen 48 to its closed or loading position. In this position of the film mount 22 as seen in FIG. 8, the opening 46 in each positioning platen 48 is precisely in register with the recessed area 24 surrounding the aperture 26 in the film mount. Since the corresponding positioning and supporting platens 48, 50 respectively hold each of the film mounts 22 in side-by-side relation, the film chips 14 which are preferably contiguous at the chopping station are spread apart and guided into the spaced apart, recessed areas 24 of the film mounts. As the leading edge of each film chip 14 exits from its guide track 38 and descends into the opening 46 in the positioning platen 48, an air jet 66 may be provided as shown in FIG. 8 to assure that the leading edge of film chip 14 will accurately descend in alignment with one edge of the recessed area 24 of the film mount. Following such alignment, the air jet 66 is turned off and the film chip 44 deposited by gravitational force into the recessed area 24. In the positioning platen 48 shown in FIG. 9, a vacuum port 68 is provided to assure engagement of the leading edge of the chip 14 with one edge of the recessed area 24 surrounding the aperture 26. Once this has been accomplished, the vacuum is preferably turned off and an air jet 70 is turned on for pivotally moving the chip into the recessed area. Once the film chip is deposited in the recessed area 24, a vacuum is applied to the supporting platen 50 through openings 28 in the platen for holding the film mount 22 and film chip 14 together. The supporting platen 50 may comprise a plurality of platens formed as a unitary member and conveniently mounted on a conveyor 72 (see FIG. 1) which may be indexed to a new location such as a tacking station, not shown, where the film chip may be tacked to the film mount. The film mount and tacked film chip may then be moved to subsequent stations, not shown, at which the film mount may be folded and sealed, as is well-known in the art. Where the recessed area 24 in film mount 22 is reduced in size until it is only slightly larger than film chip 14, adequate stability for the film chip may be provided to negate the requirement of tacking the film chip to the film mount. When the conveyor 72 is indexed, a new set of film mount supporting platens 50 is moved to the loading station for receiving film mounts 22 from any suitable film mount supply and feeder 73, such as a feed roller, not shown, engageable with the lowermost mount of a stack of mounts for feeding the film mounts along suitable tracks or guideways 75 into passageways 52. The web 16 is advanced in timed relation to the film mount supply feeder to position another film containing a plurality of exposure frames, such as 20 for example, at the chopping station, and the chopping mechanism 12 activated to chop off the new group of film chips 14 which are transported to the loading station in spread apart relation and properly oriented and deposited within the recessed areas 24 of the film mounts 22.

Figure 5:
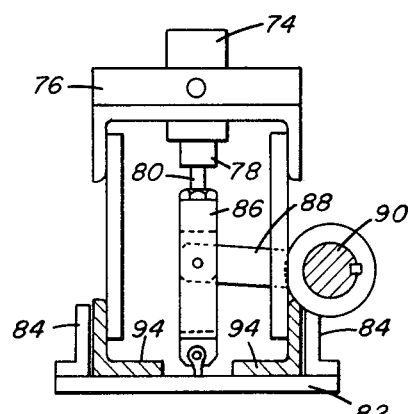
FIG. 5 is an enlarged view in section taken along line 5—5 of FIG. 2.

A mechanism for moving the positioning platens 48 relative to the film mount supporting platens 50 between retracted and loading positions, as best seen in FIGS. 2, 4, and 5, comprises an air cylinder 74 secured to a fixed block 76 and having a reciprocally movable piston 78 and piston rod 80 connected to a plate 82 securing together one of the ends of a pair of actuator bars 84, (see FIG. 4) which are in turn secured to opposite ends of the positioning platens 48. Although the platens 48 are shown as individual parts, it is conceivable that they could be fabricated as a unitary bar having a plurality of spaced frusto-conical grooves. The piston rod 80 is secured to a link 86 which is pivotally secured near its midpoint to one end of an arm 88, the opposite end of which is secured to a rotatably mounted shaft 90. A similar arm 92 is secured to the opposite end of shaft 90 and is coupled by any suitable linkage to a plate securing together the opposite ends of the bars 84. The bars 84 are guided for reciprocal movement by a fixed U-shaped beam 94 (see FIGS. 3, 4 and 5) and are precisely located relative to the beam by adjusting pads 96 carried by the bars 84 and engageable with the sides of the beam 94. Operation of the cylinder 74 causes both bars 84 to be raised or lowered equal amounts for raising or lowering positioning platens 48.

The air cylinder 74 normally holds the positioning platens 48 in a retracted position, as seen in FIG. 4, spaced from complementary supporting platens 50 to form passageways 52 therebetween into which film mounts 22 may be inserted. When actuated, air cylinder 74 forces the positioning platens 48 toward the supporting platens 50 and into engagement with the film mounts 22 as seen in FIG. 8. The guide tracks 38 are secured by brackets 98 to beam 94, with the lower ends of the tracks 38 extending through openings 100 in the beam and into slots 102 (see FIG. 4) in the positioning platens 48 adjacent the openings 46 in the positioning platens. During reciprocal movement of positioning platens 48 between their retracted and loading positions, the lower ends of tracks 38 slidably move within slots 102.

After the film mount is loaded, it is necessary to retract the stop member 60 to provide proper clearance for the conveyor prior to advancement of the conveyor 72 and the loaded supporting platens 50 to the next station. This is accomplished as best seen in FIGS. 2 and 4 by a pair of air cylinders 104 having pistons 106 and piston rods 108 connected to opposite ends of a bar 110 for moving springs 112 secured to the bar into engagement with the stop members 60 for pivotally moving the members against the bias of their springs 62.

The chopping mechanism 12 (see FIGS. 1, 2 and 6) may be any well-known type of cutting mechanism, and in this invention is shown as a plurality of movable shear blades 114 of a length exceeding the width of the film strip 16 and cooperable with the complementary aforementioned fixed shear blades 30 for chopping film strip 16 interposed therebetween into a plurality of film chips 14. The movable shear blades 114 are secured to a mounting bar 116 (see FIG. 6), extending for the full length of the film strip and the bar is mounted for vertical reciprocal movement by posts 118 secured to bar 116 and movable within fixed bushings 120. The bar 116 and shear blades 114 are movable by any suitable air cylinder 122 secured to bar 116 between a retracted position in which the movable blades 114 are spaced from the fixed blades 30 to define a passageway therebetween through which film strip 16 may be fed and a chopping position in which the movable and fixed blades 114, 30 respectively cooperate to chop the strip into a plurality of film chips 14.

The film strip 16 may comprise a plurality of films, each having a plurality of exposure frames spliced together in a single roll 124 (see FIG. 2A) which is mounted on a supply shaft 126 and fed over a plurality of guide rollers and through a chute 128 by drive pinch rollers 130 into the passageway between the fixed and movable blades 30, 114 respectively in their retracted position. The film strip 16 is properly oriented relative to the shear blades 30, 114 by any suitable film advance mechanism such that when the chopping mechanism 12 is operated, a customer's film will be chopped precisely between the exposure frames into a plurality of film chips 14, each containing an exposure frame, and guided by the guiding mechanism to the loading station. To assure continuous operation, a second supply roll 132 and guide rollers are provided so that as soon as the first roll has expired, a second roll of film 16 may be fed by pinch rollers 134 through the chopping mechanism without any undue delay.

The invention has been described in detail with particular reference to a preferred embodiment thereof, but it will be understood that variations and modifications can be effected within the spirit and scope of the invention as described hereinabove.

We claim:

1. In an article handling machine having chopping means at a chopping station for simultaneously chopping a plurality of articles from a web containing successive articles for deposit in spaced relation into complementary article receptors, the combination comprising for each article:
   means defining an article loading station;
   receiving and positioning means at said loading station for receiving and precisely positioning an article receptor;
   means for transporting a chopped article from said chopping station to said loading station; and
   means at said loading station for precisely orienting the article with the article receptor.

2. The invention according to claim 1 wherein said orienting means couples said receiving and positioning means to said transporting means at said loading station.

3. The invention according to claim 1 wherein said receiving and positioning means comprise a first platen for supporting an article receptor, a second platen having means movable into engagement with at least one side of said article receptor for precisely positioning the article receptor in a lateral direction and stop means on one of said first and second platens for precisely positioning the article receptor in a longitudinal direction.

4. The invention according to claim 1 wherein said receiving and positioning means comprise a first platen for supporting an article receptor, a second platen defining an opening, said second platen further having means movable into engagement with at least one side of said article receptor for precisely positioning the article receptor in lateral register with said opening, and stop means on one of said platens for precisely positioning the articles receptor in longitudinal register with said opening.

5. The invention according to claim 1 wherein said receiving and positioning means comprise a first platen for supporting an article receptor, a second platen defining an opening, said second platen further having means movable into engagement with at least one side of said article receptor for precisely positioning the article receptor in lateral register with said opening, stop means on one of said platens for precisely positioning the article receptor in longitudinal register with said opening, and said orienting means comprise a first fluid jet adapted when enabled to impart a fluid stream against an article entering said opening to assure proper registration of one edge of the article with the article receptor.

6. The invention according to claim 1 wherein said receiving and positioning means comprise a first platen for supporting an article receptor, a second platen defining an opening, said second platen further having means movable into engagement with at least one side of said article receptor for precisely positioning the article receptor in lateral register with said opening, stop means on one of said platens for precisely positioning the article receptor in longitudinal register with said opening, and said orienting means comprise a vacuum port defined by said second platen in fluid communication with said opening to assure proper registration of one edge of the article with the article receptor and a fluid jet adapted when enabled to impart a fluid stream against the article for urging the article into the article receptor.

7. The invention according to claim 1 wherein said receiving and positioning means comprise a first platen for supporting an article receptor, second platen defining an opening, said second platen being movable between a retracted position in which said second platen is spaced from said first platen for receiving an article receptor therebetween, and a loading position in which said second platen engages at least one side of the article receptor for precisely positioning the article receptor in lateral register with said opening, stop means on one of said platens for precisely positioning the article receptor in longitudinal register with said opening and said orienting means comprise a fluid jet adapted when enabled to impart a fluid stream against an article entering said opening to assure proper registration of one edge of the article with the article receptor.

8. The invention according to claim 1 wherein said receiving and positioning means comprise a first platen for supporting an article receptor, a second platen defining an opening, said second platen further being movable between a retracted position in which said second platen is spaced from said first platen for receiving an article receptor therebetween, and a loading position in which said second platen engages at least one side of the article receptor for precisely positioning the article receptor in lateral register with said opening, stop means on one of said platens for precisely positioning the article receptor in longitudinal register with said opening, and said orienting means comprise a vacuum port defined by said second platen in fluid communication with said opening to assure proper registration of one edge of the article with the article receptor, and a fluid jet adapted when enabled to impart a fluid stream against the article for urging the article into the article receptor.

9. The invention according to claim 1 wherein said receiving and positioning means comprise a first platen having vacuum means for supporting an article receptor, a second platen having means movable into engagement with at least one side of the article receptor for precisely positioning the article receptor in lateral register with said orienting means, and stop means on one of said first and second platens for precisely positioning the article receptor in longitudinal register with said orienting means.

10. The invention according to claim 1 wherein said receiving and positioning means comprise a first platen for supporting an article receptor and mounted on a movable conveyor, a second platen having means movable into engagement with at least one side of said article receptor for precisely positioning the article receptor in a lateral register with said orienting means, and stop means on one of said platens for precisely positioning the article receptor in longitudinal register with said orienting means.

11. The invention according to claim 1 wherein said receiving and positioning means comprise a first platen for supporting an article receptor, a second platen having means movable into engagement with at least one side of said article receptor for precisely positioning the article receptor in lateral register with said orienting means, stop means on one of said first and second platens for precisely positioning the article receptor in longitudinal register with said orienting means, and said transporting means comprise a guide track having one end for receiving an article chopped off by said chopping means and its other end coupled to said second platen.

12. The invention according to claim 11 wherein said second platen defines a first opening for receiving articles from said transporting means, said second platen further having a second opening adjacent said first opening for slidably receiving said other end of said guide track.

13. A process for precisely positioning an article in an article receptor comprising the steps of:
   simultaneously chopping a plurality of articles from a web containing successive articles;
   transporting the articles to a loading station having article receptors in spaced relation;
   receiving and precisely positioning the article receptors at the loading station; and
   precisely orienting each of the transported articles received from the guide chutes at the loading station with a complementary article receptor at the loading station.

14. A process for precisely positioning an article in an article receptor, comprising the steps of:
   simultaneously chopping a plurality of articles from a web containing spaced articles;
   transporting the articles by guide chutes to a loading station having article receptors in spaced relation and spreading the articles apart during such transport;
   receiving and precisely positioning the article receptors at the loading station; and
   precisely orienting each of the articles received from the guide chutes at the loading station with a complementary article receptor at the loading station.

15. A process for precisely positioning an article in an article receptor, comprising the steps of:
   simultaneously chopping a plurality of articles from a web containing articles in contiguous relation;
   imparting a predetermined position to the chopped articles;
   transporting the articles by guide chutes to a loading station having article receptors in spaced relation, and spreading the articles apart during such transport;
   receiving and precisely positioning the article receptors at the loading station;
   precisely orienting an edge of each of the articles received from the guide chutes at the loading station with an edge of an article receiving recess in the article receptor at the loading station; and
   depositing each of the oriented articles in its complementary article receiving recess.

* * * * *